United States Patent [19]

Hladis

[11] Patent Number: 5,261,741
[45] Date of Patent: Nov. 16, 1993

[54] MALFUNCTION MONITORING DEVICE AND METHOD FOR A MULTIPLE-PORT MIXHEAD PLUNGER

[75] Inventor: Alan Hladis, Akron, Ohio

[73] Assignee: The Dow Chemical Company, Midland, Mich.

[21] Appl. No.: 713,922

[22] Filed: Jun. 12, 1991

[51] Int. Cl.⁵ .............................................. B01F 15/02
[52] U.S. Cl. ..................................... 366/132; 366/134; 366/137; 366/159; 366/177; 366/142; 422/133
[58] Field of Search ............... 366/159, 142, 177, 142, 366/339, 164, 152, 160, 132, 162, 19, 76, 134, 137; 422/133; 222/145; 137/115, 563, 606, 625.4, 637

[56] References Cited

U.S. PATENT DOCUMENTS

| | | | |
|---|---|---|---|
| 2,724,581 | 11/1955 | Pahl et al. | 259/18 |
| 3,050,003 | 8/1962 | Edwards | 103/25 |
| 3,223,068 | 12/1965 | Van Winkle | 116/65 |
| 3,702,619 | 11/1972 | Son | 366/177 |
| 3,730,297 | 5/1973 | Colgan et al. | 184/6.4 |
| 3,750,134 | 7/1973 | Weisend | 340/324 A |
| 3,901,178 | 8/1975 | Bermel | 116/70 |
| 3,999,686 | 12/1976 | Kato | 222/39 |
| 4,090,695 | 5/1978 | Stone et al. | 366/76 |
| 4,430,886 | 2/1984 | Rood | 73/37 |
| 4,440,314 | 4/1984 | Vetter et al. | 366/160 |
| 4,592,657 | 6/1986 | Taubenmann | 366/134 |
| 4,613,059 | 9/1986 | Merkel | 222/52 |
| 4,668,948 | 5/1987 | Merkel | 340/825.3 |
| 4,695,433 | 9/1987 | Scrivo et al. | 366/134 |
| 4,800,367 | 1/1989 | Klintenstedt et al. | 340/526 |
| 4,835,701 | 5/1989 | Ohiwa et al. | 366/134 |
| 4,854,713 | 8/1989 | Soechtig | 422/133 |
| 4,944,599 | 7/1990 | Soechtig | 366/177 |
| 4,976,546 | 12/1990 | Beattie | 366/19 |

OTHER PUBLICATIONS

List of U.S. Patents Assigned to Nordson Corporation.

*Primary Examiner*—Harvey C. Hornsby
*Assistant Examiner*—Reginald L. Alexander

[57] ABSTRACT

Malfunctions of plunger (15) in the mixhead (10) of a system for mixing a plurality of fluids such as polyol and isocyanate for the manufacture of polyurethane foam, which plunger induces variations in fluid pressures as the mixhead operates, are monitored by a method that includes the steps of measuring the upstream pressure of at least one fluid and generating a signal responsive thereto, and comparing the pressure responsive signal to a preselected pressure responsive signal and generating an alarm if the pressure responsive signal comparison falls outside preselected limits. A device for implementing such a method includes transducers (40, 41) for measuring the pressure of at least one fluid and generating a signal responsive thereto, an alarm (44) for generating a malfunction alarm, and a circuit (43) for receiving the pressure responsive signal and comparing the pressure responsive signal to a preselected pressure responsive signal and generating an alarm signal if the pressure responsive signal comparison falls outside preselected limits.

12 Claims, 4 Drawing Sheets

MALFUNCTION MONITORING DEVICE AND METHOD FOR A MULTIPLE-PORT MIXHEAD PLUNGER

TECHNICAL FIELD

The present invention relates generally to a monitoring device and method for the mixture of at least two fluid materials. More particularly, the present invention relates to a device and method for monitoring the operational condition of a multiple-port mixhead such as that used for the manufacture of polyurethane foam. Still more specifically, the present invention relates to a device and method for monitoring whether the plunger in a multiple-port polyurethane foam mixhead has malfunctioned.

BACKGROUND ART

The manufacture of certain compositions require the combination of two or more component fluid materials, often under high pressures in a mixhead to suitably meter and/or blend the component fluid materials, which mixhead employs a plunger reciprocating within a mixing chamber. If the plunger breaks or otherwise fails, the constituent fluid materials may not mix properly causing significant delay and additional expense in manufacturing operations. For example, during the manufacture of polyurethane foam accomplished by the mixing of a polyol with an isocyanate in such a mixhead, failure to cease operation promptly upon malfunction of the mixhead plunger results in blockages in the mixhead, and supply and return lines, necessitating difficult and potentially costly clean-up, new setup and down time. I have appreciated that monitoring select operational parameters to determine whether the mixhead plunger has failed and, if so, generating a suitable alarm, allows implementation of measures to minimize or eliminate such deleterious consequences.

In the past the flow of liquid or gas in a variety of dispensing and mixing systems has been monitored most commonly by measuring pressure at or following the point of dispensing or mixing, respectively, comparing such pressure with a preselected pressure magnitude or small range of pressure magnitudes, and triggering an alarm when such magnitude or small range of magnitudes were exceeded. For example, U.S. Pat. Nos. 4,430,886 and 4,668,948 present methods, apparatus and circuits for the sensing of a clogged paint spray nozzle by measuring paint pressure and comparing the magnitude of such pressure to preselected limit(s). Other applications in which fixed pressure limits have been used to monitor dispensing flow conditions include the pump alarm system of U.S. Pat. No. 3,050,003, the pneumatic warning systems of U.S. Pat. No. 3,223,068, the liquid lubricant pumping system of U.S. Pat. No. 3,730,297, the plasticizer portion of an injection molding machine in U.S. Pat. No. 3,750,134, and the fluid dosing circuit of U.S. Pat. No. 4,800,367.

Several exemplary applications involving mixing include the machine for making carbonated beverages depicted in U.S. Pat. No. 2,724,581, the apparatus for mixing two gases shown in U.S. Pat. No. 3,901,178, the apparatus for combining an additive to a monomer for the manufacture of plates shown in U.S. Pat. No. 3,999,686, and the lacquer mixer of U.S. Pat. No. 4,440,314.

The reason such applications as these may successfully monitor and compare pressure to a preselected fixed pressure magnitude or small range of pressure magnitudes is because pressure remains substantially constant throughout operation. Indeed, when there is a minor perturbation in pressure, the device and method has been designed to eliminate or mask such variations. For example, in U.S. Pat. No. 4,613,059 a spray nozzle for the application of an adhesive is shown to include a so-called pulse masking circuit 28 for suppressing all pressure variations before reaching a steady-state from which the comparative pressure magnitude may be taken.

However, where fluid materials are blended in a mixhead that employs a plunger reciprocating within a mixing chamber to suitably meter and/or blend the component fluid materials, operating parameters such as pressures may vary significantly as the plunger opens and closes each material inlet port. Thus, any effort at detecting a plunger malfunction by comparing such monitored pressures to preselected fixed limits would be unsuccessful, identifying false malfunctions and missing entirely some situations in which actual damage has occurred.

SUMMARY OF THE INVENTION

It is, therefore, an object of the present invention to provide a device and method for malfunction monitoring of a multiple-port mixhead plunger.

It is another object of the present invention to provide a device and method for malfunction monitoring of a multiple-port mixhead plunger, as set forth above, which minimizes or eliminates identification of false malfunctions and the lack of identification of actual malfunctions.

It is still another object of the present invention to provide a device and method for malfunction monitoring of a multiple-port mixhead plunger, as set forth above, in which one or more of the parameters utilized to determine plunger malfunction vary significantly during normal operational conditions.

It is still a further object of the present invention to provide a device and method for malfunction monitoring of a multiple-port mixhead plunger, as set forth above, which measures pressures that vary significantly as the plunger opens and closes an inlet port for each constituent material.

These and other objects and advantages of the present invention over existing prior art forms will become more apparent and fully understood from the following description in conjunction with the accompanying drawings.

In general, a device for monitoring the operational condition of the plunger in a system for mixing a plurality of fluids in a mixhead having a plunger inducing variations in fluid pressures as the mixhead operates, includes a transducer for measuring the pressure of at least one fluid and generating a signal responsive thereto, an alarm for generating a malfunction alarm, and a circuit for receiving the pressure responsive signal and comparing the pressure responsive signal to a preselected pressure responsive signal and generating an alarm signal if the pressure responsive signal comparison falls outside preselected limits.

In general, in a system for mixing a plurality of fluids in a mixhead having a plunger inducing variations in fluid pressures as the mixhead operates, a method for monitoring the operational condition of a plunger includes the steps of measuring the pressure of at least one fluid and generating a signal responsive thereto, and, comparing the pressure responsive signal to a preselected pressure responsive signal and generating an alarm if the pressure responsive signal comparison falls outside preselected limits.

BRIEF DESCRIPTION OF THE DRAWINGS

FIGS. 4A and 4B depict exemplary configurations for two-port mixheads; FIGS. 4C and 4D depict exemplary configurations for three-port and four-port plungers, respectively.

PREFERRED EMBODIMENT FOR CARRYING OUT THE INVENTION

Figure 1:
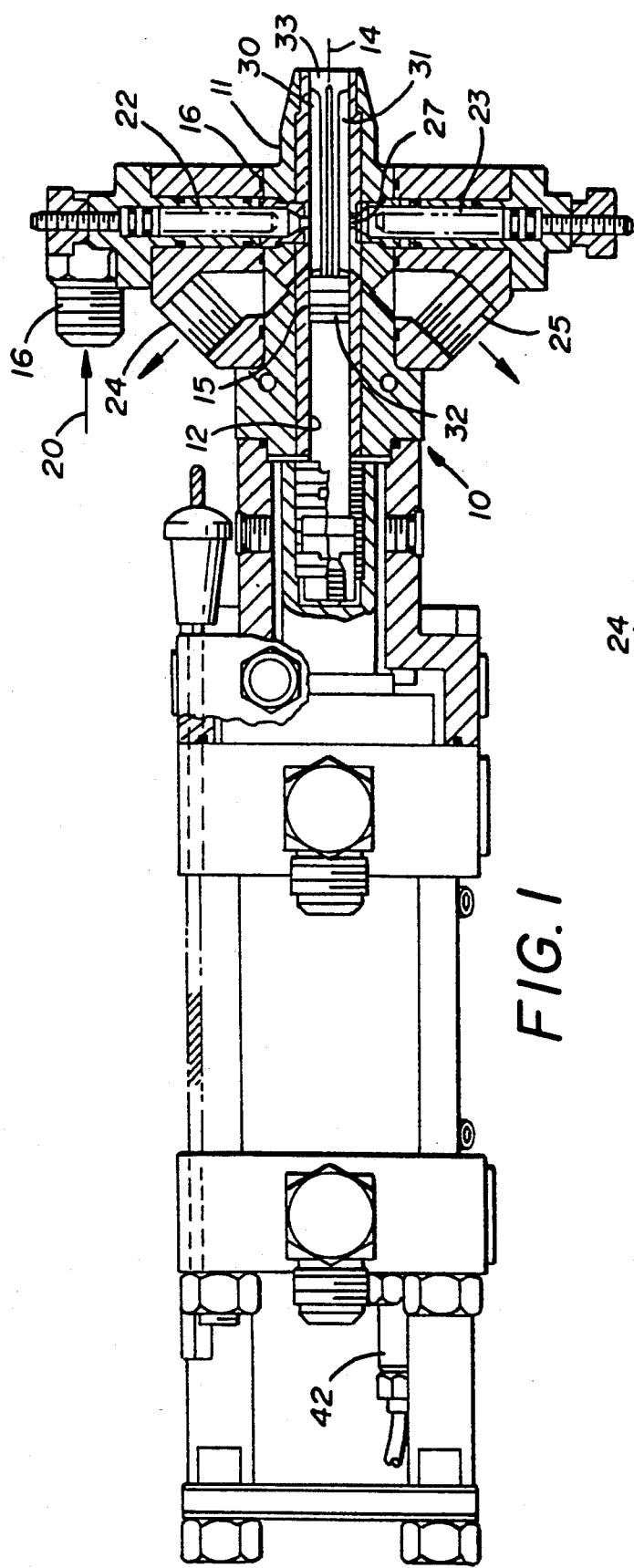
FIG. 1 is an elevation and partial section view of an exemplary multiple-port mixhead for the manufacture of polyurethane foam in accordance with the present invention.
Figure 2:
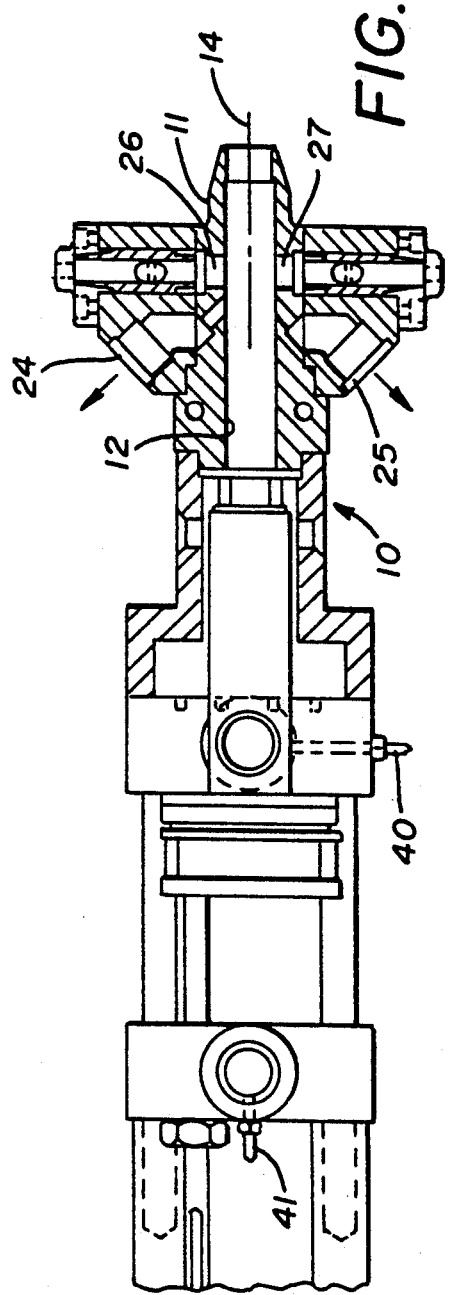
FIG. 2 is a somewhat more simplified elevation and partial sectional view of the exemplary multiple-port mixhead for the manufacture of polyurethane foam shown in FIG. 1.

FIG. 1 presents in elevation and partial section an exemplary multiple-port mixhead, generally indicated with the numeral 10, for the manufacture of polyurethane foam. A somewhat more simplified elevation and partial sectional view of mixhead 10 is shown in FIG. 2. Mixhead 10 includes a body 11 having a bore 12 along the longitudinal axis 14 of mixhead 10 within which a plunger 15 selectively reciprocates as hereinafter further explained. A plurality of inlet ports 16, 17 (17 is not shown) are positioned circumferentially around body 11 into which the fluid materials 20, 21 (21 is not shown) to be mixed are fed under suitable pressure. Adjustment stems 22, 23 communicate with inlet ports 16, 17, respectively, and selectively allow fluid materials 20, 21 to pass through orifices 26, 27, respectively, into bore 12 in proximity to plunger 15. Outlet ports 24, 25 also positioned circumferentially around body 11 receive the mixed fluid materials from bore 12 and connect to the return lines (not shown) in operative association with the remaining apparatus for the manufacture of polyurethane foam.

Figures 4A, 4B, 4C, 4D:
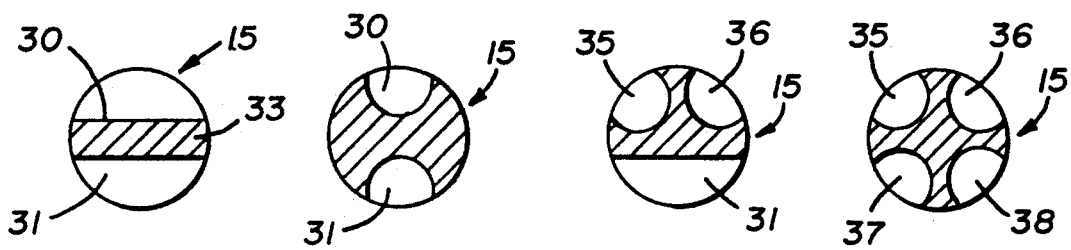
FIGS. 4A through 4D are cross-sections of exemplary configurations for mixhead plungers.

Plunger 15 is substantially cylindrical in shape, engages the inside walls of bore 12, and includes two or more grooves 30, 31 therein and end caps 32, 33 on both ends thereof. While the specific number and configuration of grooves 30, 31 are not part of the present invention, as can be best seen in the exemplary cross-sections of plunger 15 shown in FIGS. 4A through 4D, grooves 30, 31 are of such length and configuration to correspond to the number of inlet ports and are suitable to combine the fluid materials to be mixed. In FIG. 4A a plunger 15 for use with a mixhead 10 having two input ports 16, 17, can be seen to include two semi-circular grooves 30, 31 shaped to define a substantially planar central portion 33. The plunger 15 configuration of FIGS. 4B, 4C and 4D are intended for use with two-, three- and four-ports, respectively, and can be seen to include semi-circular grooves 35, 36, 37 and 38.

Figure 3:
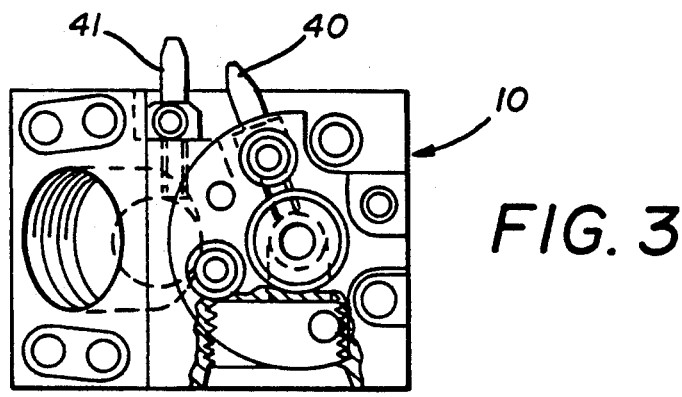
FIG. 3 is an end view of the exemplary multiple-port mixhead for the manufacture of polyurethane foam shown in FIG. 1.

A plurality of transducers measure various mixhead pressures and the displacement of plunger 15. Conventional pressure transducers suitable for the range of operating pressures of mixhead 10 may be mounted upon or in proximity to mixhead 10 to monitor the pressure of one or more fluid materials at inlet ports 16, 17 (which may be called the upstream pressure transducer) and, if desired, the pressure at one or more outlet-ports 24, 25 (which may be called the downstream pressure transducer). FIG. 3, an end elevational view of mixhead 10, and FIG. 2 show the upstream pressure transducer 40 and downstream pressure transducer 41.

The position of plunger 15 may be monitored in any manner as would occur to the skilled artisan such as with the use of a linear variable displacement transducer (LVDT) 42 connected to mixhead 10 as shown in FIG. 1. Alternatively, where only select positional information is desired, plunger 15 position may be monitored with limit or proximity switches (not shown) mounted at the selected positions of interest, such as zero and full travel.

Figure 5:
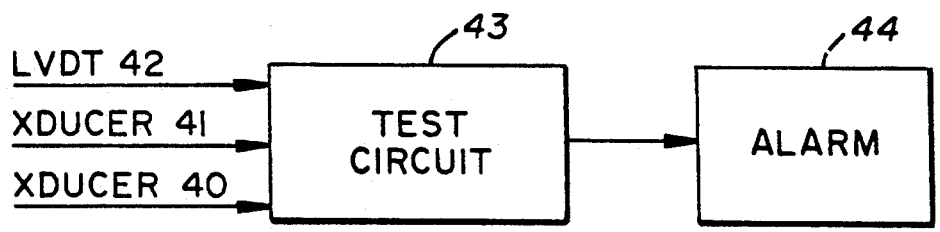
FIG. 5 is a block diagram of an exemplary test circuit and alarm for use with the present invention.

The output signals from the various transducers may be received by a conventional test circuit 43 (FIG. 5) for comparing such signals to preselected signals and parameters explained hereinbelow. In the event a malfunction condition is found, test circuit 43 may generate any suitable signal to actuate an audible and/or visible alarm 44 and, where desired, initiate other suitable corrective measures.

The operation of mixhead 10 relevant to the present invention is straightforward and may be best understood by reference to FIGS. 5 through 8. During operation plunger 15 is hydraulically reciprocated within bore 12 from a position as shown in FIG. 1 where fluid materials 20, 21 are permitted to flow through orifices 26, 27 and grooves 30, 31, and exit through outlet ports 24, 25, through a mid-point position where the end cap 33 is opposite orifices 26, 27, blocking the flow of fluid materials therefrom, and to its final, full displacement position.

Figure 6:
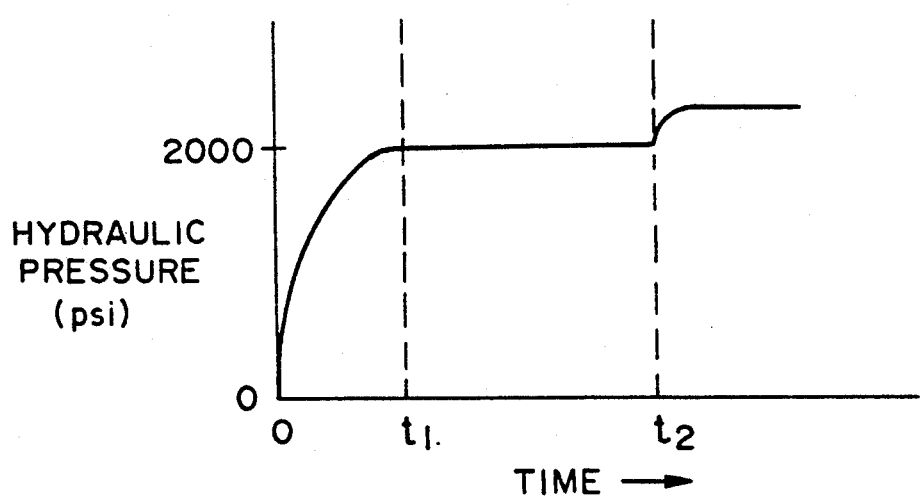
FIG. 6 is a graph of the hydraulic pressure required to displace the plunger over time for a single stroke. While this Figure and that of FIGS. 7 and 8 are not to scale or necessarily coordinated in time, in this Figure and FIGS. 7 and 8, time zero represents the time at which actuation of plunger motion is first initiated, time $t_1$ represents the time at which the plunger begins actual motion, and time $t_2$ represents the time the plunger 15 reaches its position of full travel and its motion stops.

FIG. 6 presents a graph of the hydraulic pressure required to displace the exemplary plunger 15 over time for a single stroke. At time zero actuation of plunger motion is first initiated. After some period of time during which the pressure on plunger 15 builds exponentially, plunger 15 begins to move at the point in time $t_1$ represented by the dashed vertical line on the left side of the graph, whereupon the pressure remains substantially constant. In the present example of a mixhead for the manufacture of polyurethane foam, a pressure of about 2000 psi has been found to exist during travel of plunger 15. At the point in time $t_2$ represented by the dashed vertical line on the right side of the graph, plunger 15 reaches its position of full travel, as seen in FIG. 1, and its motion stops, producing a final, constant pressure that is slightly greater than that during its motion.

Figure 7:
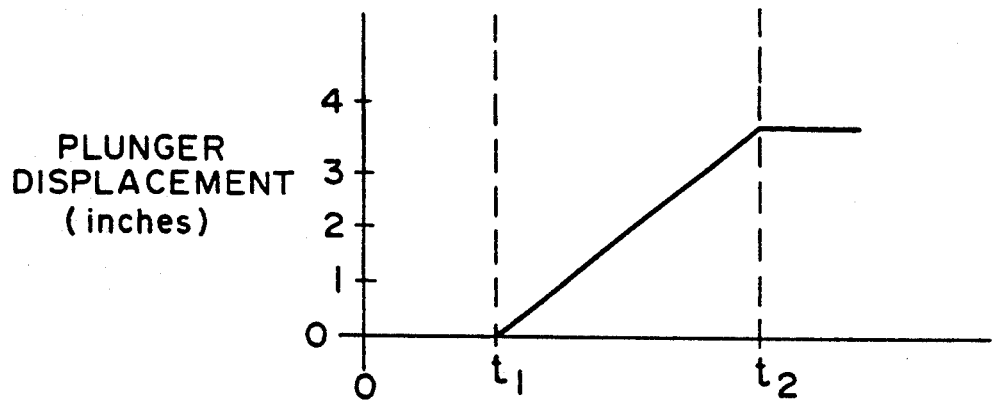
FIG. 7 is a graph of the displacement of plunger 15 during the same single stroke depicted in FIG. 6.

FIG. 7 depicts the displacement of plunger 15 during the same single stroke depicted in FIG. 6. As observed from this graph, plunger 15 moves at a substantially constant rate from the time of its first motion until it reaches its full travel position.

Figure 8:
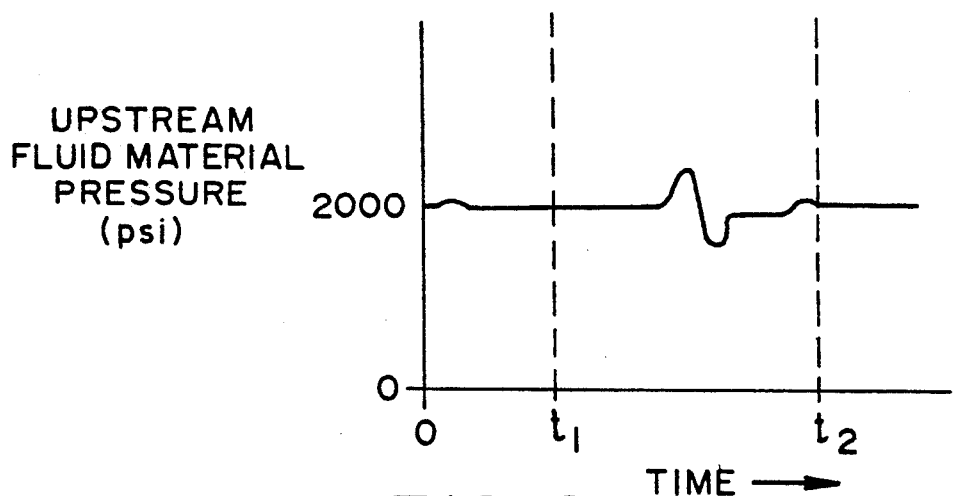
FIG. 8 is a graph of the signal generated by upstream fluid material pressure transducer 41 reflecting the upstream fluid material pressure during the same single stroke depicted in FIG. 6.

FIG. 8 shows the signal generated by upstream pressure transducer 41 reflecting the upstream fluid material pressure during the same single stroke depicted in FIG. 6. As observed from this graph, as end cap 33 moves past orifices 26, 27 thereby closing and reopening the same, a variation (which for convenience may be called a pulse or spike) is produced in the upstream fluid material pressure which otherwise remains substantially constant, significantly increases, decreases and returns to its original magnitude of about 2000 psi in the present example. In other words, normal operation of plunger 15 produces a significant variation in the upstream fluid material pressure measured by upstream pressure transducer 40.

Perhaps the most common type of plunger 15 malfunction involves the failure of the plunger to move as designed, either because it is broken or for some other reason. If plunger 15 fails before end cap 33 passes over orifices 26, 27, the skilled artisan should now appreciate that there will be no variation in upstream fluid material pressure. If plunger 15 fails after end cap 33 passes over orifices 26, 27, the skilled artisan will now appreciate no signal of full travel displacement will be received from LVDT 42. Thus, by monitoring both the signal from upstream pressure transducer 41 and comparing it to the signal that would be received if a pulse occurs in the time frame anticipated, and by monitoring the signal from LVDT 42 and comparing it to the signal that would be received if plunger 15 reached its full displacement position within the time frame anticipated, an alarm may be generated or other control action taken to minimize the deleterious effects of a plunger 15 malfunction.

Figure 9:
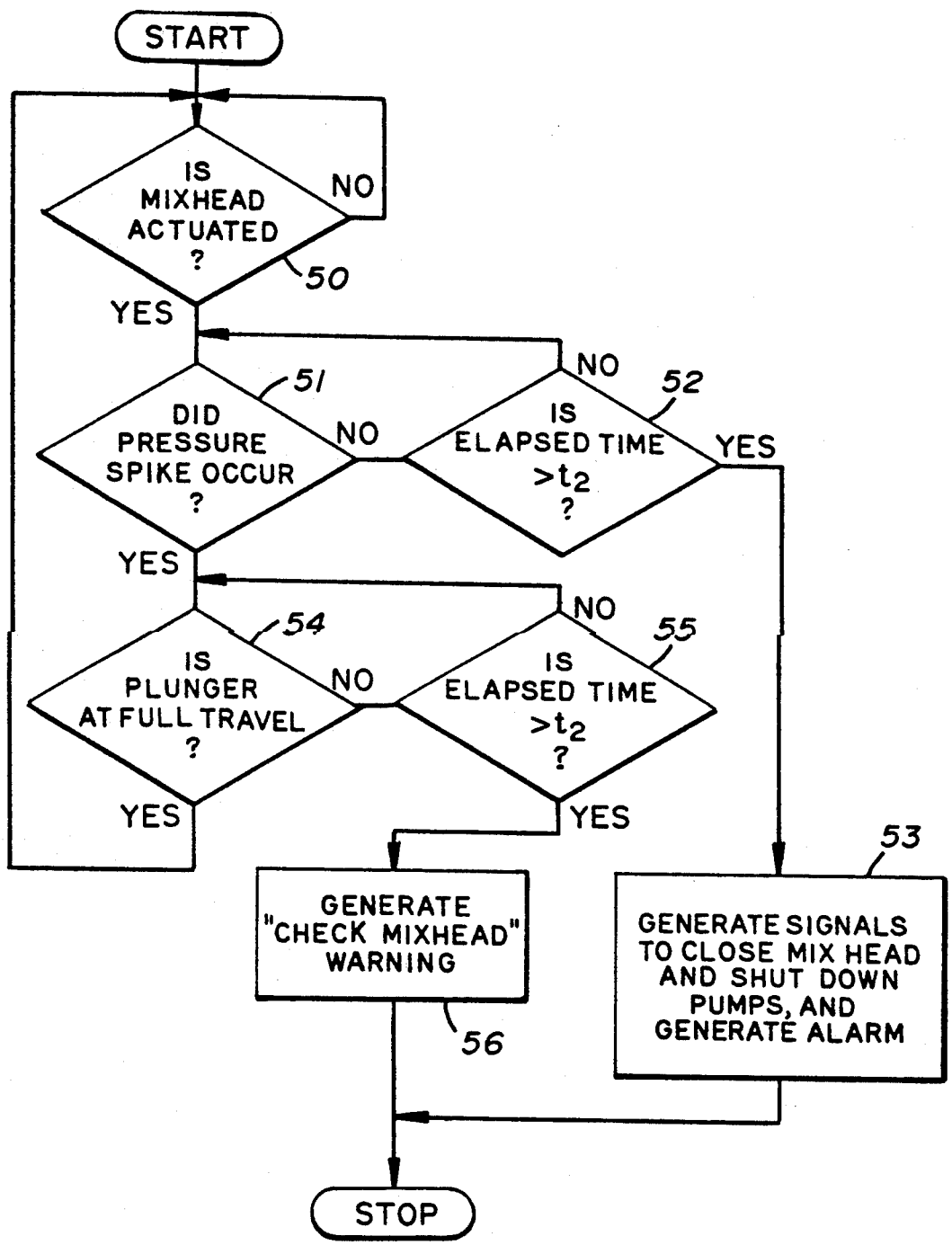
FIG. 9 is a flow chart of an exemplary method for malfunction monitoring of a multiple-port mixhead plunger in accordance with the present invention.

More particularly, FIG. 9 presents a top level logic flow chart of an exemplary method for malfunction monitoring of a multiple-port mixhead plunger in accordance with the present invention. Once operation is begun, a check is repeatedly made (in block 50) of whether mixhead 10 has been actuated. Such a check may be readily accomplished by monitoring for the presence of an actuation signal from LVDT 42 or a proximity switch suitably located with reference to plunger 15.

Once plunger 15 motion is initiated, the upstream fluid material pressure measured by upstream pressure transducer 40 is tested in block 51 for the presence of a pulse or other suitable variation. This may be achieved, for example, as would occur to the skilled artisan, by examining the slope and/or minimum and maximum magnitudes of the variation, or by more closely comparing the measured upstream fluid pressure profile with the anticipated profile.

If no pulse or other suitable variation in pressure has occurred, the elapsed time is checked in block 52, and, if time $t_2$ has not elapsed, the upstream fluid material pressure again tested as in block 51. However, if time $t_2$ has elapsed, since no pulse or other suitable variation has occurred the plunger 15 must have malfunctioned, necessitating any or all of a variety of automatic corrective actions (block 53) such as closing the mixhead input ports, shutting down the fluid material feed pumps and generating appropriate visual and/or audio alarm(s).

If a pulse or other suitable variation in pressure has occurred, in block 54 LVDT 42 is sampled (or proximity switch checked) to determine if plunger 15 has arrived at its position of full travel. If it has, operation has concluded without incident and the next actuation of mixhead 10 is awaited as depicted in block 50. If plunger 15 has not arrived at its position of full travel, the elapsed time is once again checked (in block 55) to see if time $t_2$ has elapsed. If not, LVDT 42 is again sampled in block 54; if time $t_2$ has elapsed, since an acceptable pressure variation has occurred but the plunger has not completed its travel in the normal time period, a warning to check mixhead 10 is generated in block 56 or other desired action taken.

While upstream fluid pressure has been utilized in the exemplary device and method described herein for carrying out the present invention, it will be understood that other parameters whose variations with the operation of plunger 15 have been established (such as downstream fluid pressure) may be similarly utilized instead of or in addition to that of upstream fluid pressure.

Inasmuch as the present invention is subject to variations, modifications and changes in detail, a number of which have been expressly stated herein, it is intended that all matter described throughout this entire specification or shown in the accompanying drawings be interpreted as illustrative and not in a limiting sense. It should thus be evident that a device constructed and method performed according to the concept of the present invention, and reasonably equivalent thereto, will accomplish the objects of the present invention and otherwise substantially improve the art of malfunction monitoring of a multiple-port mixhead plunger.

What is claimed is:

1. In a mixing system, a device comprising:
   mixhead means for receiving and mixing a plurality of fluids under pressure, said mixhead means having a plunger inducing variations in said pressures as said mixhead means operates;
   means for measuring said pressure of at least one said fluid at a plurality of preselected time intervals and generating a signal responsive thereto;
   circuit means for receiving said pressure responsive signal, comparing said pressure responsive signal occurring at said plurality of preselected time intervals to a preselected pressure responsive signal occurring at a like plurality of preselected time intervals, said preselected pressure responsive signal being a dynamic signal representative of the value of said pressure responsive signal if there were no malfunction in the operation of said mixhead plunger at that point in time, and generating an alarm signal if said pressure responsive signal comparison falls outside preselected limits; and,
   alarm means receiving said alarm signal for generating a malfunction alarm.

2. A device, as set forth in claim 1, wherein said means for measuring sad pressure of at least one said fluid includes means for measuring said pressure of at least one said fluid prior to mixing in said mixhead means.

3. A device, as set forth in claim 1, wherein said circuit means includes means for determining whether the variations in said pressure responsive signal are in the form of the variations in said preselected pressure responsive signal.

4. A device, as set forth in claim 1, further including means for monitoring the plunger position and generating a signal responsive thereto, said circuit means receiving and comparing said plunger position responsive signal to a preselected plunger position responsive signal and generating an alarm if said plunger position responsive signal comparison falls outside preselected limits.

5. A device, as set forth in claim 4, wherein said means for monitoring the plunger position includes means for monitoring whether the plunger has moved to its final, preselected position and generating a signal responsive thereto.

6. A device, as set forth in claim 5, wherein said circuit means includes means for determining if the plunger has moved to its final, preselected position after a preselected time delay.

7. A method for monitoring operational condition in a mixing system including the steps of:
  receiving and mixing a plurality of fluids under pressure in mixhead means having a plunger inducing variations in said pressures as said mixhead means operates;
  measuring said pressure of at least one said fluid at a plurality of preselected time intervals and generating a signal responsive thereto; and,
  comparing said pressure responsive signal occurring at a plurality of preselected time intervals to a preselected pressure responsive signal occurring at a like plurality of preselected time intervals, said preselected pressure responsive signal being a dynamic signal representative of the value of said pressure responsive signal if there were no malfunction in the operation of said mixhead plunger at that point in time, and generating an alarm if said pressure responsive signal comparison falls outside preselected limits, thereby monitoring the operational condition of said plunger.

8. A method, as set forth in claim 7, wherein said step of measuring said pressure of at least one said fluid includes the step of measuring said pressure of at least one said fluid prior to mixing in said mixhead means.

9. A method, as set forth in claim 7, wherein said step of comparing said pressure responsive signal includes the step of determining whether the variations in said pressure responsive signal are in the form of the variations in said preselected pressure responsive signal.

10. A method, as set forth in claim 7, further including the steps of monitoring the plunger position and generating a signal responsive thereto; and, comparing said plunger position responsive signal to a preselected plunger position responsive signal and generating an alarm if said plunger position responsive signal comparison falls outside preselected limits.

11. A method, as set forth in claim 10, wherein said step of monitoring the plunger position includes the step of monitoring whether the plunger has moved to its final, preselected position and generating a signal responsive thereto.

12. A method, as set forth in claim 11, wherein said step of comparing said plunger position responsive signal includes the step of determining if the plunger has moved to its final, preselected position after a preselected time delay.

* * * * *